(12) United States Patent
Hagstrom et al.

(10) Patent No.: US 12,228,222 B2
(45) Date of Patent: Feb. 18, 2025

(54) FLUIDIC CONTROL VALVE

(71) Applicant: Regents of the University of Minnesota, Minneapolis, MN (US)

(72) Inventors: Nathan P. Hagstrom, Minneapolis, MN (US); Matthew L. Gallagher, Minneapolis, MN (US); Thomas R. Chase, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

(21) Appl. No.: 18/297,869

(22) Filed: Apr. 10, 2023

(65) Prior Publication Data

US 2023/0323980 A1      Oct. 12, 2023

Related U.S. Application Data

(60) Provisional application No. 63/329,527, filed on Apr. 11, 2022.

(51) Int. Cl.
*F16K 99/00* (2006.01)
*F16K 1/36* (2006.01)
*F16K 15/02* (2006.01)
*F16K 31/00* (2006.01)

(52) U.S. Cl.
CPC ...... *F16K 99/0005* (2013.01); *F16K 99/0048* (2013.01); *F16K 1/36* (2013.01); *F16K 15/023* (2013.01); *F16K 31/007* (2013.01)

(58) Field of Classification Search
CPC . F16K 1/12; F16K 1/36; F16K 15/023; F16K 15/028; F16K 31/004; F16K 31/007; Y10T 137/86759; Y10T 137/86791; Y10T 137/87265
USPC ............................................. 251/129.06, 333
See application file for complete search history.

(56) References Cited

U.S. PATENT DOCUMENTS

| 1,269,616 A  *  | 6/1918 | Bozec ................... F16K 15/023 |
| | | 251/285 |
| 5,333,831 A | 8/1994 | Barth et al. |
| 6,986,365 B2 | 1/2006 | Henning et al. |
| 10,330,212 B2 | 6/2019 | Chase et al. |
| 11,067,187 B2 | 7/2021 | Hagstrom et al. |

OTHER PUBLICATIONS

Marie, et al., "Experimental Leak-Rate Measurement Through a Static Metal Seal", Journal of Fluids Engineering, Jun. 2007, vol. 129 pp. 799-805.

* cited by examiner

*Primary Examiner* — Robert K Arundale
(74) *Attorney, Agent, or Firm* — Brian D. Kaul; Westman, Champlin & Koehler, P.A

(57) ABSTRACT

A valve includes an orifice plate including at least one orifice surrounded by an orifice plate seal surface, a seal plate, and an actuator. The seal plate includes a seal boss having a seal boss surface that faces the orifice plate, and a pocket that overlays the at least one orifice. The pocket includes a recessed surface that is surrounded by the seal boss surface and is displaced from the seal boss surface along an axis. The actuator is configured to move the seal plate relative to the orifice plate along the axis to transition the valve between open and closed states. The seal boss surface engages the orifice plate seal surface, surrounds the at least one orifice, and blocks a flow of fluid through the at least one orifice when the valve is in the closed state.

11 Claims, 8 Drawing Sheets

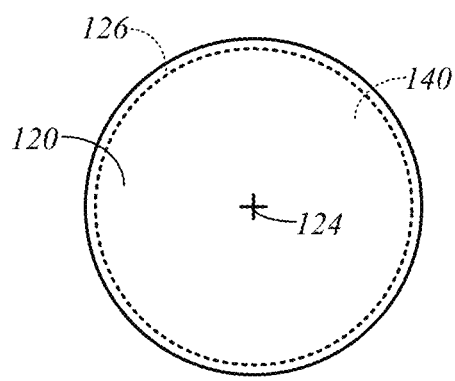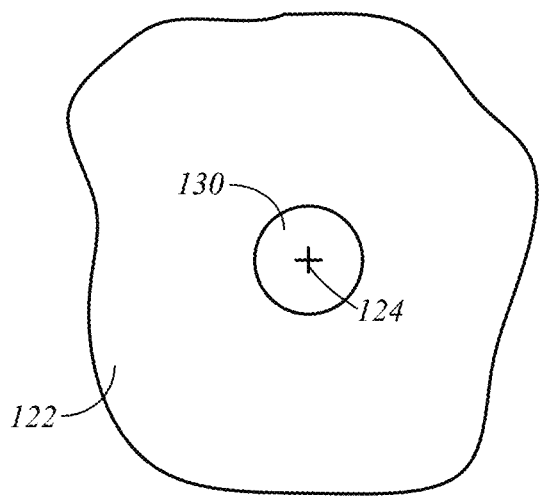
FIG. 7A
FIG. 7B
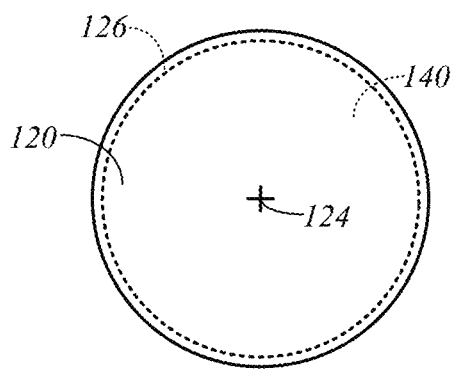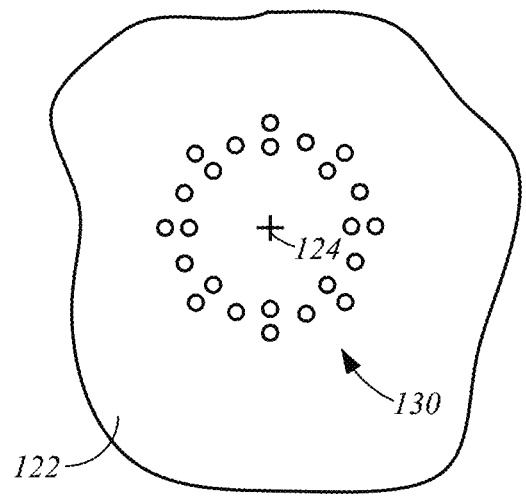
FIG. 8A
FIG. 8B
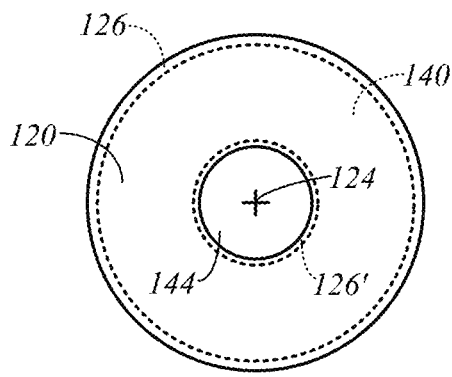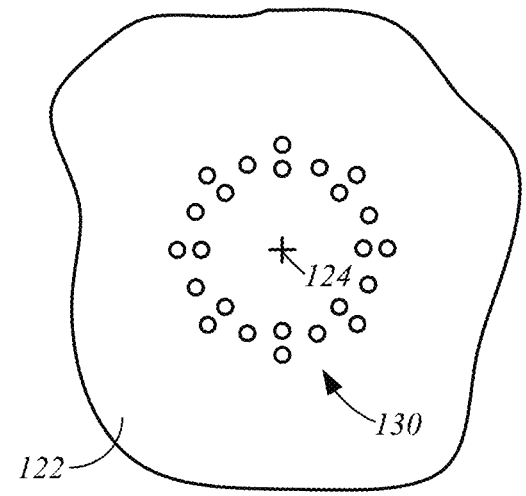
FIG. 9A
FIG. 9B

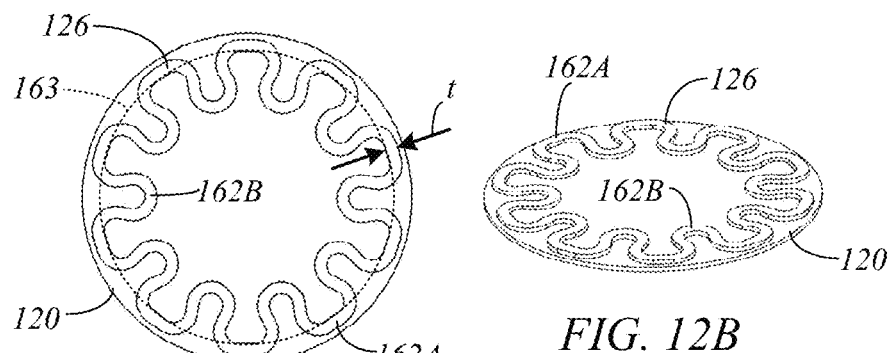
FIG. 12A
FIG. 12B
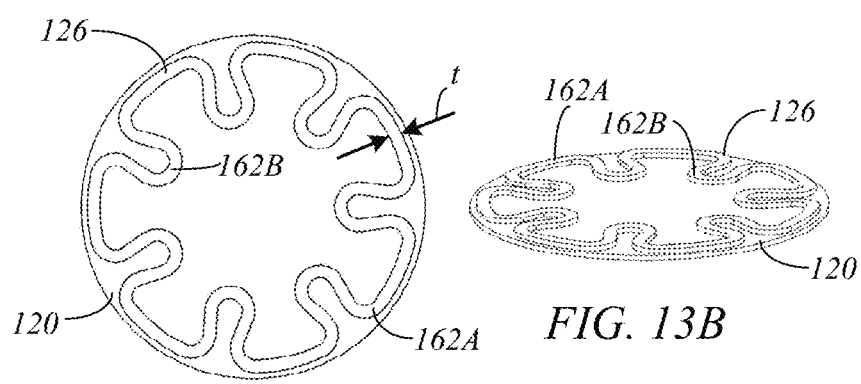
FIG. 13A
FIG. 13B

FLUIDIC CONTROL VALVE

CROSS-REFERENCE TO RELATED APPLICATION

The present application is based on and claims the benefit of U.S. provisional patent application Ser. No. 63/329,527, filed Apr. 11, 2022, the content of which is hereby incorporated by reference in its entirety.

GOVERNMENT FUNDING

This invention was made with government support under IIP-2016330 awarded by the National Science Foundation under the Partnerships for Innovation Program, and under IIP-1940068 awarded by the National Science Foundation's Innovation Corps Program. The government has certain rights in the invention.

FIELD

Embodiments of the present disclosure are directed to fluidic control valves and, more specifically, to valves that are compatible with actuators having small displacements.

BACKGROUND

Fluidic control valves, including standard valves and microvalves, are used to control the flow and/or pressure of a fluid passing through it. Inside the valve, the fluid flows through channels or orifices. Valves can be classified into two types: active and passive. Active valves utilize a powered actuator to control the opening and closure of the orifice or channel through which the fluid flows. Passive valves, on the other hand, have no actuator to control the fluid flow and are simply check valves operated by the pressure of the flowing fluid and its direction of flow. Passive valves are often used as part of pumps. In contrast, active valves are often free standing fluidic control devices.

Valves are used in pneumatic systems that require precise control of gas flow for biomedical and manufacturing processes. More recently, pneumatic active microvalves are seeing potential application in spacecraft propulsion systems, where weight, volume and power savings are vital. Another promising application of pneumatic active microvalves is in human assist devices, where power consumption and weight should be minimized.

Recently, active valves utilizing piezoelectric actuators have garnered interest because of the low power requirements of piezoelectric actuators compared to conventional actuation methods, such as magnetic actuators. However, piezoelectric valves have seen limited commercial success due to difficulties such as low flow capacity or low pressure capacity.

SUMMARY

Embodiments of the present disclosure are generally directed to valves that are compatible with small displacement actuators. In one embodiment, the valve includes an orifice plate including at least one orifice surrounded by an orifice plate seal surface, a seal plate, and an actuator. The seal plate includes a seal boss having a seal boss surface that faces the orifice plate, and a pocket that overlays the at least one orifice. The pocket includes (e.g., is defined by) a recessed surface that is surrounded by the seal boss surface and is displaced from the seal boss surface along an axis. The actuator is configured to move the seal plate relative to the orifice plate along the axis to transition the valve between open and closed states. The seal boss surface engages the orifice plate seal surface, surrounds the at least one orifice, and blocks a flow of fluid through the at least one orifice when the valve is in the closed state. The seal boss surface is displaced from the orifice plate seal surface and does not block a flow of fluid through the at least one orifice when the valve is in the open state.

Another embodiment of the valve includes an orifice plate comprising at least one orifice surrounded by an orifice plate seal surface, a seal plate, and an actuator. The seal plate includes an outer seal boss having an outer seal boss surface that faces the orifice plate, an inner seal boss having an inner seal boss surface that faces the orifice plate, a central opening surrounded by the inner seal boss and the outer seal boss, and an annular pocket between the inner and outer seal bosses that overlays the at least one orifice. The pocket includes (e.g., is defined by) an annular recessed surface that is surrounded by the inner and outer seal bosses and displaced from the inner and outer seal boss surfaces along an axis. The actuator is configured to move the seal plate relative to the orifice plate along the axis to transition the valve between open and closed states. The inner and outer seal boss surfaces engage the orifice plate seal surface and block a flow of fluid through the at least one orifice when the valve is in the closed state. The inner and outer seal boss surfaces are displaced from the orifice plate seal surface and do not block a flow of fluid through the at least one orifice when the valve is in the open state.

In yet another embodiment, the valve includes an orifice plate, a seal plate and an actuator. The orifice plate includes at least one orifice surrounded by a seal boss having a seal boss surface. The seal boss projects from an annular pocket having a recessed surface that is displaced from the seal boss surface along an axis. The seal plate includes a seal plate surface that faces the seal boss surface. The actuator is configured to move the seal plate relative to the orifice plate along the axis to transition the valve between open and closed states. The seal plate surface engages the seal boss surface and blocks a flow of fluid through the at least one orifice when the valve is in the closed state. The seal plate surface is displaced from the seal boss surface and does not block a flow of fluid through the at least one orifice when the valve is in the open state.

In another example, the valve includes an orifice plate, a seal plate, and an actuator. The orifice plate includes a non-circular orifice surrounded by an orifice plate surface. The seal plate includes a seal plate surface that faces the orifice plate surface. The actuator is configured to move the seal plate relative to the orifice plate along an axis to transition the valve between open and closed states. The seal plate surface engages the orifice plate surface and blocks a flow of fluid through the non-circular orifice when the valve is in the closed state. The seal plate surface is displaced from the orifice plate surface and does not block a flow of fluid through the non-circular orifice when the valve is in the open state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIGS. 7A and 7B are simplified top views of examples of seal plates and orifice plates corresponding to the valve of FIG. 4, in accordance with embodiments of the present disclosure.

FIGS. 8A and 8B are simplified top views of examples of seal plates and orifice plates corresponding to the valve of FIG. 5, in accordance with embodiments of the present disclosure.

FIGS. 9A and 9B are simplified top views of examples of seal plates and orifice plates corresponding to the valve of FIG. 6, in accordance with embodiments of the present disclosure.

FIGS. 12A-B are simplified top and isometric views of an example of a seal plate having a non-circular seal boss, in accordance with embodiments of the present disclosure.

FIGS. 13A-B are simplified top and isometric views of an example of a seal plate having a non-circular seal boss, in accordance with embodiments of the present disclosure.

DETAILED DESCRIPTION OF ILLUSTRATIVE EMBODIMENTS

Figure 1:
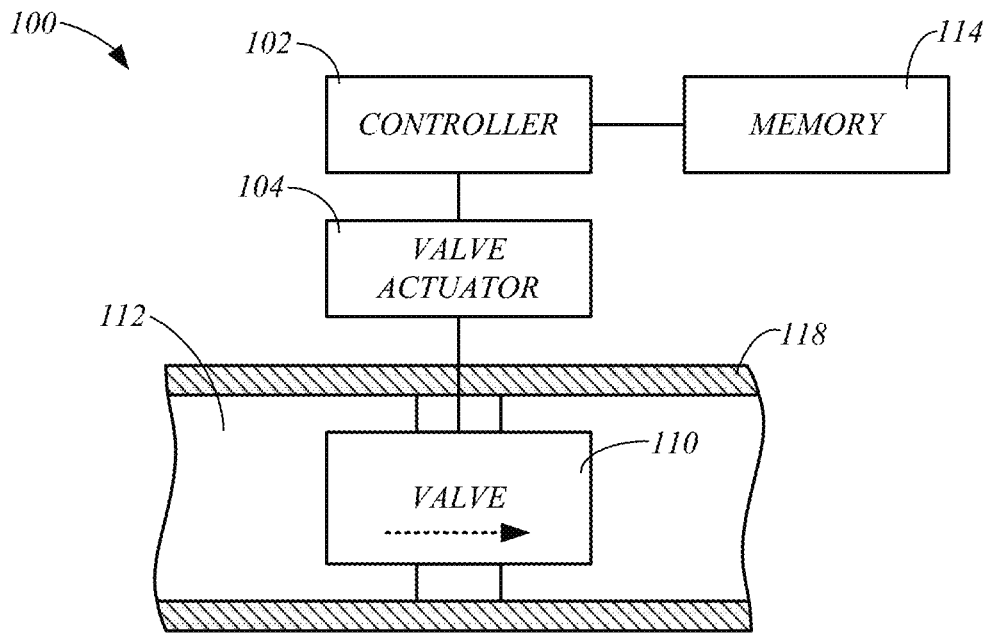
FIG. 1 is a simplified diagram of a system or device in accordance with embodiments of the present disclosure.

Embodiments of the present disclosure are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

Embodiments of the invention generally relate to a fluidic control valve or valve. As discussed below in greater detail, embodiments of the valve are configured to have a larger restricting flow area at small displacements over conventional valves.

FIG. 1 is a simplified diagram of a system or device 100 comprising a controller 102, a valve actuator 104 and a fluidic control valve (hereinafter "valve") 110, which may be a standard-sized valve or a microvalve (e.g., outer dimensions less than 10 mm). The device or system 100 may represent a mass flow controller, a pilot valve for a pneumatic positioner, a battery powered pilot valve, a generic control valve, a medical ventilator control valve, a hydraulic valve for controlling micro-flows, a pilot valve for a larger hydraulic valve, or another device.

The valve 110 controls a flow of fluid through a fluid pathway 112, such as conduit 118. The valve 110 may be actuated using the valve actuator 104 to a closed state, in which a fluid is prevented from flowing through the valve 110 along the pathway 112, and to an open state, in which the fluid is allowed to flow through the valve 110 along the pathway 112. The valve 110 may have a variable open state, and the valve actuator 104 may adjust the open state of the valve 110 to control a flow rate of the fluid through the pathway 112.

The controller 102 may be used to control the valve actuator 104 to control the state of the valve 110 and the fluid flow through the pathway 112. The controller 102 may be an analog controller. Alternatively, the controller 102 may represent one or more processors (e.g., a central processing unit) that control the valve actuator 104 and/or other components to perform one or more functions described herein. The controller 102 performs these control functions in response to the execution of instructions, which may be stored in memory 114 that represents local and/or remote memory or computer-readable media. Such memory 114 comprises any suitable patent subject matter eligible computer readable media that do not include transitory waves or signals such as, for example, hard disks, CD-ROMs, optical storage devices, and/or magnetic storage devices. The one or more processors of the controller 102 may be components of one or more computer-based systems, and may include one or more control circuits, microprocessor-based engine control systems, and/or one or more programmable hardware components, such as a field programmable gate array (FPGA).

Figure 2:
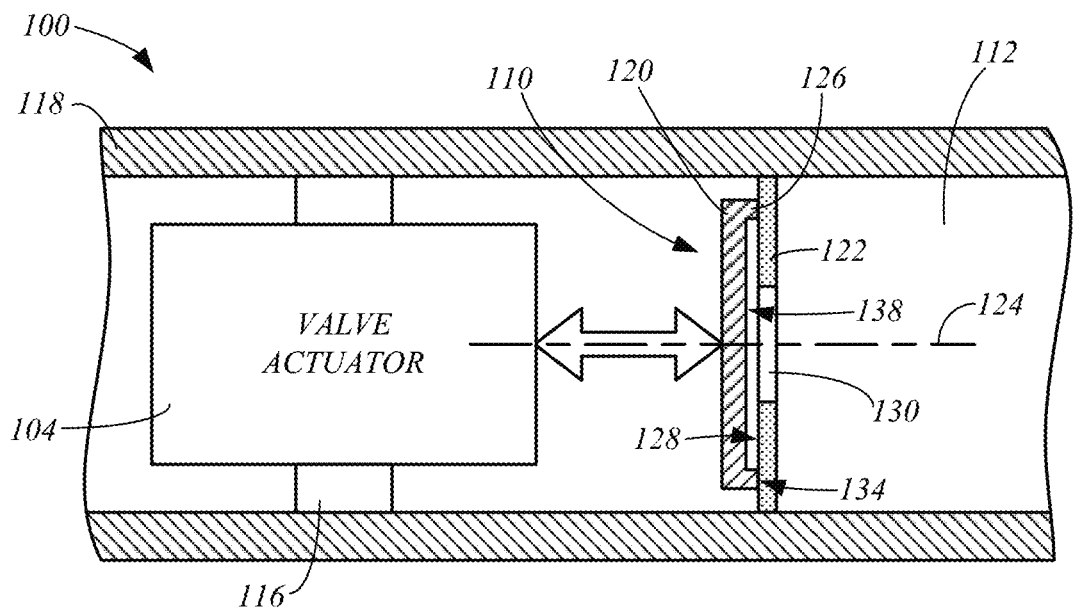
FIGS. 2 and 3 are simplified side cross-sectional diagrams of an example of a valve formed in accordance with embodiments of the present disclosure in closed and open states, respectively.
Figure 3:
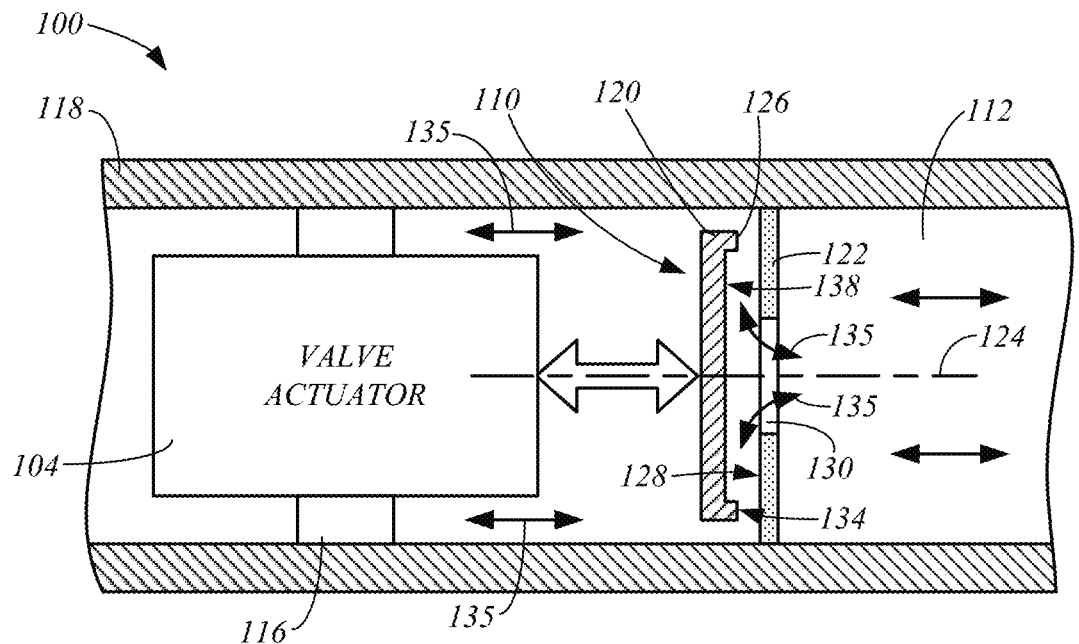

FIGS. 2 and 3 are simplified side cross-sectional diagrams of an example of a valve 110 formed in accordance with embodiments of the present disclosure, respectively in closed and open states. The valve 110 may include, or may be mounted within, a housing or conduit 118 that defines the fluid pathway 112. In some embodiments, the valve actuator 104 may be supported within the conduit 118 by a bracket or brace 116.

The valve 110 includes a seal plate 120 and an orifice plate 122. These and other components of the valve 110 may be formed using various techniques, such as micro-electro-mechanical systems (MEMS) device fabrication, photo-chemical etching, plunge electrical discharge machining (EDM), additive manufacturing, and computerized numerical control (CNC) machining, for example. The seal plate 120 and orifice plate 122 may be manufactured out of any suitable material such as steel, stainless steel, aluminum, silicon, or engineering plastic.

The orifice plate 122 includes one or more orifices 130. The seal plate 120 is comprised of a nonpermeable, rigid plate having an annular sealing boss 126 defined by a seal surface 134 that faces a surface 128 of the orifice plate 122. In some embodiments, the surfaces 128 and 134 are planar surfaces that are generally perpendicular to a longitudinal axis 124. In some embodiments, the conduit 118 is aligned with the axis 124. The orifice plate 122 may be sealed in the conduit 118 so that the only flow path through pathway 112 is through the one or more orifices 130. While the seal plate 120 and the orifices 130 are illustrated in the drawings as being circular in a plane that is perpendicular to the axis 124, it is understood that embodiments of the present disclosure apply equally to non-circular seal plates and orifices.

The valve actuator 104 is configured to drive movement of the seal plate 120 relative to the orifice plate 122 along the axis 124 to transition the valve 110 between the closed state (FIG. 2) and the open state (FIG. 3). It is understood that, while FIGS. 2 and 3 may illustrate the valve actuator 104 driving movement of the seal plate 120 along the axis 124 relative to conduit 118 and the orifice plate 122, the valve actuator 104 may be configured to drive movement of the orifice plate 122 relative to the seal plate 120, which may be anchored to, and sealed against the conduit 118.

The valve actuator 104 is configured to drive movement of the seal plate 120 relative to the orifice plate 122 along the axis 124 to press the surface 134 of the annular sealing boss 126 against the surface 128 of the orifice plate 122, as shown in FIG. 2. This forms a seal that prevents a fluid flow from traveling through the orifices 130 and places the valve 110 in the closed state.

The valve actuator 104 is also configured to transition the valve 110 to the open state shown in FIG. 3 by moving the seal plate 120 relative to the orifice plate 122 along the axis 124. This displaces the surface 134 of the sealing boss from the surface 128 of the orifice plate 122 and opens a path through which a fluid flow 135 may travel through the orifice 130 and the valve 110, as indicated in FIG. 3.

It is understood that the valve actuator 104 may have an inactive or unpowered state, in which the valve 110 is biased into the closed or open state, such as using a spring mechanism. In this case, the actuation of the valve 110 overcomes this bias to drive the desired movement of the seal plate 120 relative to the orifice plate 122 and transition the valve to the non-biased open or closed state.

In some embodiments, the valve actuator 104 is a small displacement actuator. As used herein, a small displacement valve actuator is one that is not configured to move the seal plate 120 relative to the orifice plate 122 a distance of more than 100-micrometers. Thus, small displacement actuators are distinguishable from conventional valve actuators that are configured to drive much larger displacements, such as up to 300 micrometers or up to 500 micrometers. In some embodiments, the valve actuator 104 is configured to drive movement of the seal plate 120 relative to the orifice plate 130 along the axis 124 no more than 100 micrometers, such as approximately 5-100 micrometers, 10 micrometers, 20 micrometers, 30 micrometers, 40 micrometers or 50 micrometers, for example.

Some examples of suitable small displacement valve actuators 104 include a piezostack. Piezostack actuators are composed of a stack of many layers of a piezoelectric material. Such piezostack actuators rely on the change in thickness of a piezoelectric material when a voltage is applied to produce a deflection. They produce relatively large forces but very small deflections. Exemplary piezostack actuators that may be suitable for use as the valve actuator 104 include those manufactured by PI (Physik Instrumente L.P.), such as Item #P-885.55, Item #P-885.95, Item #P-888.55, Item #P-882.51, Item #P-883.51, Item #P-885.51, Item #P-885.91, Item #P-887.51, Item #P-887.91, Item #P-888.51, and Item #P-888.91 or those marketed by Thorlabs Inc. (www.thorlabs.com), such as Item #PK2JUP1, Item #PK2FVP1, Item #PK2FVP2, Item #PK4GA3H5P2, Part #AE0505D16F, and Part #PZS001, or those manufactured by Piezo Systems, Inc. (www.piezo.com), such as Part #TS18-H5-202. Other examples of suitable actuators that may be capable of functioning as the small displacement valve actuator 104 include, for example, magnetic, thermal, and electrostatic actuators.

Figure 16A:
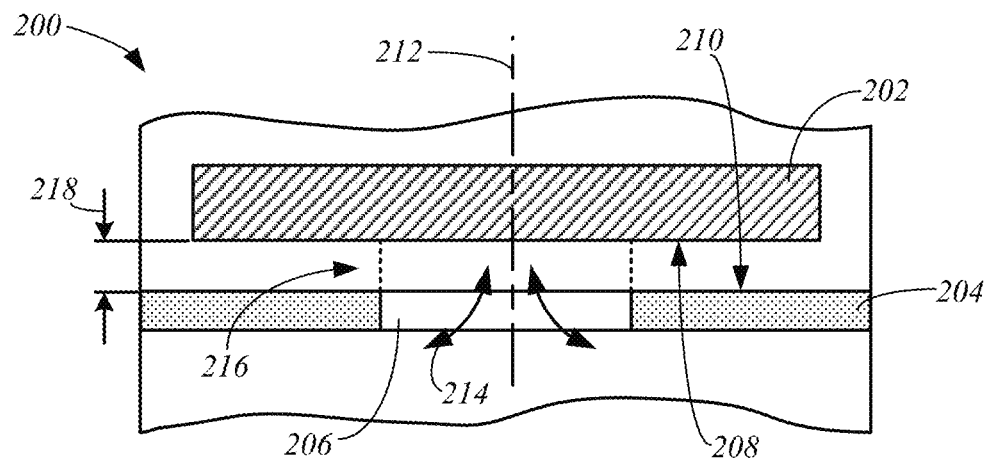
FIGS. 16A and 16B are simplified side cross-sectional views of a small displacement valve respectively in open and closed states, in accordance with the prior art.
Figure 16B:
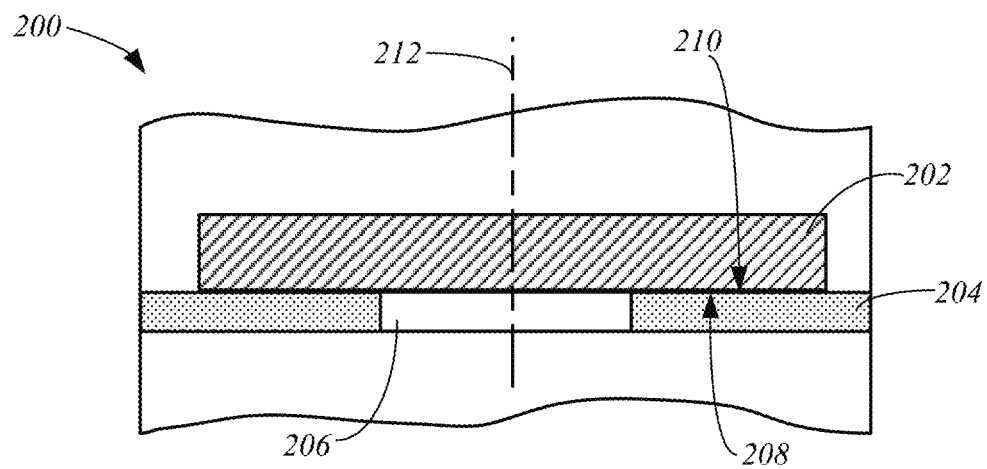

FIGS. 16A and 16B are simplified side cross-sectional views of a small displacement valve 200 respectively in open and closed states, in accordance with the prior art. The valve 200 includes a seal plate 202 and an orifice plate 204 having a circular orifice 206. Other components of the valve 200, such as the valve actuator are not shown to simplify the illustration.

The seal plate 202 has a flat planar surface 208 that faces a flat planar surface 210 of the orifice plate 204. When the surfaces 208 and 210 are displaced from each other along an axis 212, which is perpendicular to the surfaces 208 and 210, the valve 200 is in the open state and a fluid flow 214 is allowed to travel through the orifice 206, as indicated in FIG. 16A. When the surfaces 208 and 210 are placed in contact with each other, a seal is formed that blocks a flow of fluid through the orifice 206 and the valve 200 is in the closed state, as shown in FIG. 16B.

The flow capacity of the valve 200 in the open state is limited by a flow restricting area that is either a peripheral area 216 (FIG. 16A) of a projection of the perimeter of the metering orifice 206 from the flat sealing surface 210 of the orifice plate 204 to the flat surface 208 of the seal plate 202 in the direction of the axis 212, or by the cross-sectional area of the metering orifice 206. At small displacements 218 (e.g., 0.1 times the diameter of the orifice 206) of the surface 208 from the surface 210 along the axis 212, the cross-sectional area of the orifice 206 is much larger than the peripheral area above the orifice 206. As a result, the peripheral area 216 projected above the orifice 206 operates as the flow restricting area and limits the flow capacity of the valve 200.

The valve 110 formed in accordance with embodiments of the present disclosure includes features that operate to overcome or improve upon the flow capacity limitations of the prior art valves at small displacements. In general, embodiments of the present disclosure configure the seal plate 120 and/or the orifice plate 122 such that the peripheral area of the valve 110 at small displacements between the surface 134 of the seal plate 120 and the surface 128 of the orifice plate 122 along the axis 124 is larger than that in conventional small displacement valves, such as valve 200. This results in an increase in the flow restricting area of the valve 110 over comparable conventional valves and allows for larger flow capacities at small displacements. Additionally, the improved design of the valve 110 can provide these improvements while either maintaining or decreasing the overall size of the valve 110. Thus, the valve 110 may be particularly useful as a microvalve.

Figure 4:
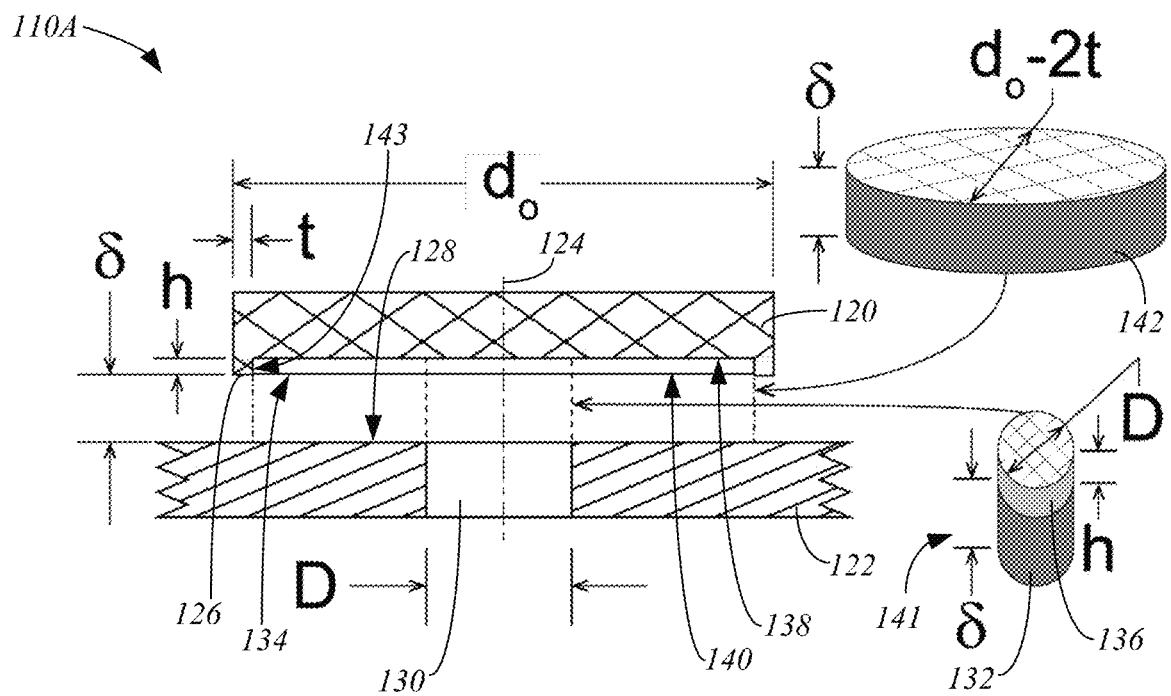
FIGS. 4-6 are simplified side cross-sectional views of examples of valves in an open state, in accordance with embodiments of the present disclosure.
Figure 5:
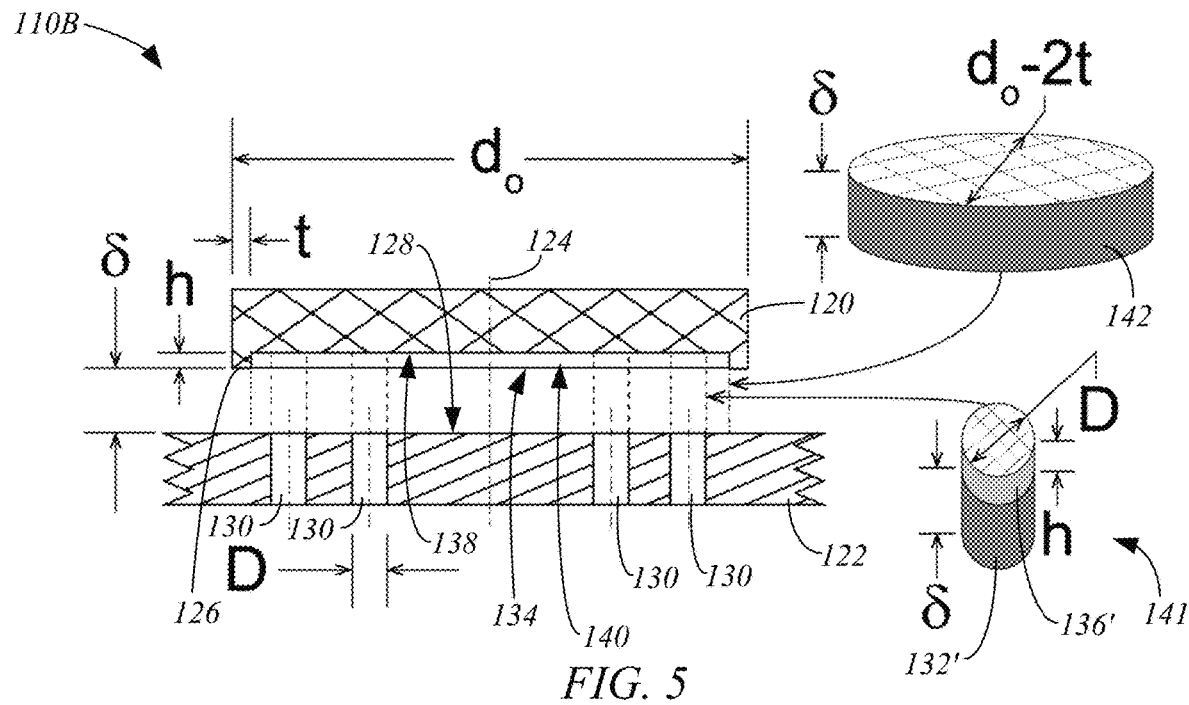
Figure 6:
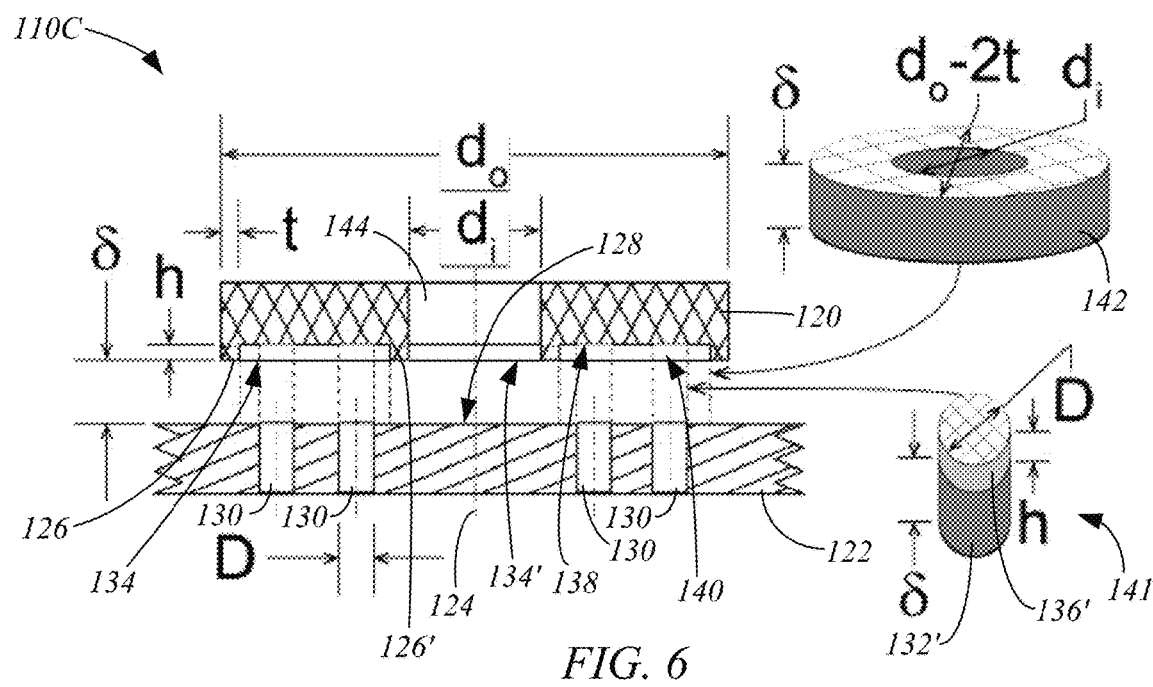

FIGS. 4-6 are simplified side cross-sectional views of examples of valves 110 in the open state, in accordance with embodiments of the present disclosure. The valve actuator 104 and other components are not shown to simplify the illustrations. Simplified top views of examples of embodiments of the seal plate 120 and the orifice plate 122 corresponding to the valves 110 of FIGS. 4-6 are respectively shown in FIGS. 7-9.

As discussed above, the seal plate 120 of the valve 110 includes a seal boss 126 having a planar seal surface 134 and a thickness t that is configured to surround and seal the one or more orifices 130 of the plate 122 when the valve 110 is in the closed state (FIG. 2). Thus, the seal surface 134 is configured to contact the surface 128 of the orifice plate 122 and seal the orifice 130 of the valve 110A (FIG. 4) or the orifices 130 of the valves 110B (FIG. 5) and 110C (FIG. 6), when the valve is in the closed state (FIG. 2). The open state of the valves 110 shown in FIGS. 4-6 results in the surface 134 of the seal boss 126 being displaced from the surface 128 of the orifice place 122 a distance δ along the axis 124. In the examples of the valve 110 shown in FIGS. 4-6, the seal plate 120 has a diameter $d_0$ and each orifice 130 has a diameter of D.

In some embodiments, the valve 110 may form a "hard seal", where the orifice plate sealing surface 128 and the seal plate sealing surface 134 are both formed of a "hard" material, such as stainless steel. For example, high vacuum applications, such as microelectronics fabrication, may require such a hard seal and prevent the use of elastomers on the sealing surfaces to avoid outgassing from such elastomers. However, embodiments of the present disclosure also include the use of elastomeric coatings that form one or both of the sealing surfaces 128 and 134. Such coatings may be allowable in certain applications and may provide the benefit of reducing leakage. Thus, in some embodiments, the sealing surface 128 and/or the sealing surface 134 may include or be formed of a thin elastomeric coating for use in applications where outgassing is not an issue.

The seal plate 120 of the valves 110 may be circular and substantially concentric (e.g., +/−1-3 mm) with the axis 124. The single orifice 130 of the orifice plate 122 of the valve 110A (FIG. 4) may also be circular and substantially concentric (e.g., +/−1-3 mm) with the axis 124. In some embodiments, the seal plate 120 or orifice 130 may be shaped as a square, a pentagon, a hexagon, an octagon, a septagon or another faceted approximation of a circle. The surfaces 128 and 134 are generally parallel to each other and perpendicular to the axis 124.

In some embodiments, a recessed surface 138 is formed in the seal plate 120 and is inset a distance h from the surface 134 along the axis 124 to form a pocket 140 in the seal plate 120 that faces the orifice plate 122 and overlays the one or more orifices 130, as shown in FIGS. 4 and 5. The surface 138 may be substantially parallel to the surface 134.

In one embodiment, the seal plate 120 of the valve 110C includes the annular seal boss 126 (outer seal boss) and an inner annular seal boss 126' located at the perimeter of the opening 144, as shown in FIG. 6. The inner and outer seal bosses 126' and 126 may have the same thickness t, as indicated in FIG. 6, or different thicknesses. The pocket 140 of the seal plate 120 of the valve 110C extends between the sealing bosses 126 and 126', has an annular shape and overlays the one or more orifices 130.

In one embodiment, the seal plate 120 includes a central opening 144, which may be substantially concentric to the axis 124, having a diameter $d_i$. The inner seal boss 126' may surround a perimeter of the central opening 144.

The inner seal boss 126' includes a seal surface 134' that is parallel to and in the plane of the surface 134. The seal surface 134' is configured to engage the surface 128 of the orifice plate 122 along with the surface 134 to seal the orifices 130 when the valve 110 is in the closed state to prevent a fluid flow from traveling through the orifices 130 and, if present, through the at least one central opening 144.

A total peripheral area 141 projected above the orifice 130 (FIG. 4) or each of the orifices 130 (FIGS. 5 and 6) of the orifice plates 122 may be divided into two distinct areas: a first peripheral area 132 and a second peripheral area 136. The first peripheral area 132 corresponds to the peripheral area created by sweeping the periphery of each orifice 130 the distance δ that the seal plate 120 is displaced from the orifice plate 122 along the axis 124 between the surfaces 128 and 134, as indicated in FIGS. 4-6. Thus, for the multiple orifice configurations of the valves 110B and 110C, the first peripheral area 132 is the sum of the first peripheral areas 132' of each orifice 130 shown in FIGS. 5 and 6.

The second peripheral area 136 of the total peripheral area 141 projected above the orifice or orifices 130 is created by sweeping the periphery of each orifice 130 the distance h between the surface 134 of the seal boss 126 and the surface 138 of the pocket 140. For the valves 110B and 110C the second peripheral area 136 is the sum of the second peripheral areas 136' of each orifice 130 shown in FIGS. 5 and 6.

The addition of the pocket 140 in the seal plate 120 creates a third relevant peripheral area 142 formed by sweeping the inner periphery (e.g., at an inner wall 143) of the seal boss 126 in the direction of the axis 124 from the bottom plane 134 to the top surface or plane 128 of the orifice plate 122, as indicated in FIGS. 4-6.

The diameter of the inner perimeter of the seal boss 126 is the diameter do of the seal plate 120 less two times the thickness t of the seal boss for the valves 110B and 110C. Thus, the third peripheral area 142 is the same for the valves 110B and 110C of FIGS. 4 and 5. For the valve 110C of FIG. 6 having the central opening 144, the third peripheral area 142 is increased over that of the valves 110B and 110C by sweeping the inner periphery of the inner seal boss 126' ($d_i$) in the direction of the axis 124 from the bottom surface 134' to the top surface 128 of the orifice plate 122.

If the valves 110 lacked the pocket 140 in seal plate 120 and the associated second peripheral area 136 of the orifice(s) 130, such as valve 200 (FIGS. 16A-B), the first peripheral area 132 would serve as the metering element or flow restricting area of the valve until the seal plate 120 is displaced a sufficient distance δ along the axis 124 that first peripheral area 132 exceeds the cross-sectional area of the orifice(s) 130.

By adding the pocket 140 to the seal plate 120, the total peripheral area of the orifice(s) 130 is increased by the second peripheral area 136, which in turn shifts the metering element or flow restricting area of the valve to the third peripheral area 142, until the third peripheral area 142 exceeds either the cross-sectional area of orifice(s) 130 or the first peripheral area 132 plus the second peripheral area 136 of the orifice(s) 130. This allows the valves 110 to have a larger metering or flow restricting area at small displacements δ (e.g., 5 micrometers, 10 micrometers, 20 micrometers, 30 micrometers, 40 micrometers or 50 micrometers) of the seal plate 120 from the orifice plate 122 along the axis 124, relative to conventional small displacement valves, such as valve 200.

Figure 10:
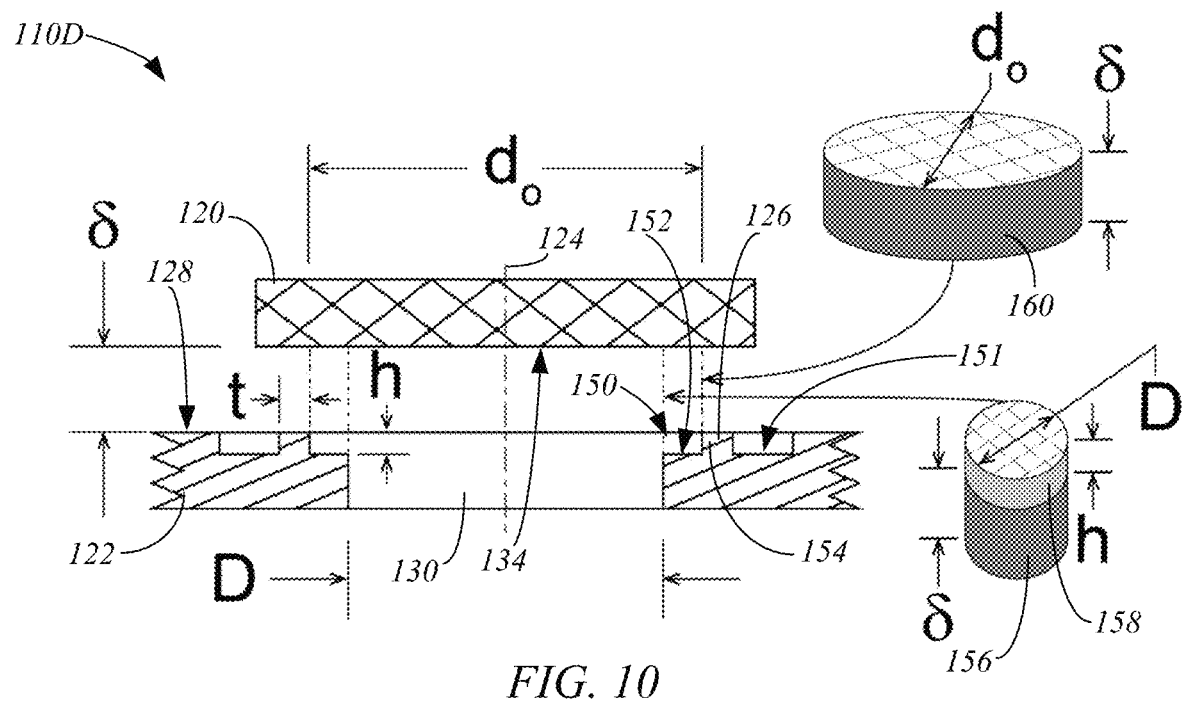
FIG. 10 is a simplified side cross-sectional view of an example of a valve in an open state, in accordance with embodiments of the present disclosure.

FIG. 10 is a simplified side cross-sectional view of a valve 110D in an open state, in accordance with embodiments of the present disclosure. The valve actuator 104 and other components are not shown to simplify the illustrations.

Figure 11A:
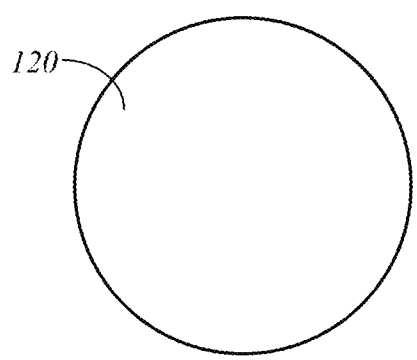
FIGS. 11A-B are simplified top views of examples of a seal plate and an orifice plate corresponding to the valve of FIG. 10, in accordance with embodiments of the present disclosure.
Figure 11B:
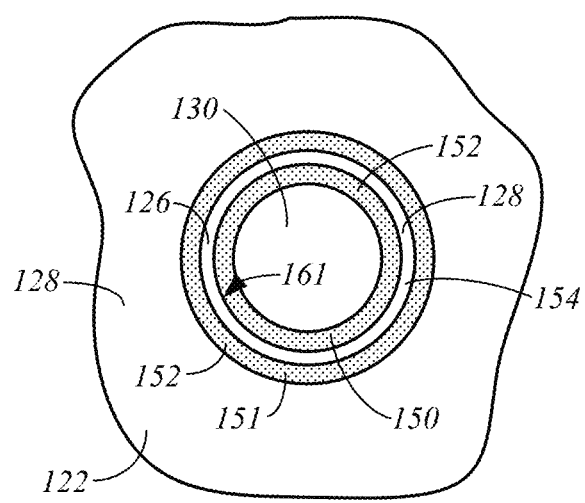

The valve 110D includes a flat seal plate 120 having a flat seal surface 134 and an orifice plate 122, simplified top views of which are shown in FIGS. 11A and 11B, respectively. The orifice plate 122 includes one or more orifices 130. Thus, while only a single orifice 130 is shown, the orifice plate 122 may take the form of the orifice plates 122 of valves 101B or 101C having multiple orifices 130.

In one embodiment, the orifice plate 122 includes an inner annular pocket 150 and/or an outer annular pocket 151 that extend around the one or more orifices 130. Each of the pockets 150 and 151 have a recessed surface 152 (shaded in FIG. 11B) that is generally transverse (e.g., perpendicular) to the axis 124, and an annular projection 154 that projects from the recessed surface 152 to the top surface 128 of the orifice plate 122 and splits the inner and outer annular pockets 150 and 151. The surface 128 of the projection 154 forms a seal boss 126. The seal boss 126 engages the seal surface 134 of the seal plate 120 when the valve 110D is in the closed state to prevent fluid flow through the one or more orifices 130.

One advantage to the outer annular pocket 151 is that it may increase the sealing pressure between the seal plate 120 and the seal boss 126. Additionally, the outer annular pocket 151 may allow the tolerance requirements between the seal plate 120 and the orifice 130 of the valve 110D to be relaxed.

The annular pocket 150 operates to increase the restricting flow area of the valve 110D in a similar manner as the pocket 140 increases the flow restricting areas of the valves 110A-C over the corresponding prior art valve 200. Here, the peripheral area projected above the one or more orifices 130 of the orifice plate 122, from the surface 152 of orifice plate 122 to surface 134 of seal plate 120, in the direction perpendicular to the plane of the top surface 128 of the orifice plate 122 and parallel to the axis 124, is divided into a first peripheral area 156 and a second peripheral area 158, as shown in FIG. 10.

Similar to the valve embodiments 110A-C of FIGS. 4-6, the first peripheral area 156 of the valve 110D is created by sweeping the periphery of the orifice 130 in the direction of axis 124 the distance δ between the top surface 128 of the orifice plate 122 and the planar sealing surface 134 of the seal plate 120. Unlike the embodiments of FIGS. 4-6, the second peripheral area 158 is created by sweeping the periphery of the orifice in the direction of the axis 124 the distance h between the plane of top surface 128 of the orifice plate 122 and the plane of the recessed surface 152 of the orifice plate 122. The planes of the surfaces 128 and 134 and the plane of the surface 152 are generally transverse (e.g., perpendicular) to the axis 124. The addition of the pocket 150 in the orifice plate 122 creates a third relevant peripheral area 160 corresponding to the area created by sweeping the inside edge 161 of the seal boss 126 in the direction of axis 124 from the plane of the surface 128 of the orifice plate 122 to the plane of the surface 134 of the seal plate 120.

The addition of the pocket 150 creates two peripheral areas which decouple the projected areas 156 and 158 above the orifice(s) 130 from the peripheral area 160 projected from the inner periphery of the seal boss 126. This allows the valve 110D to have a large metering area using small displacements δ of the seal plate 120 along the axis 124 relative to the orifice plate 122 without incurring a reduction in flow capacity due to the area projected above the orifice 130.

Additional embodiments of the present disclosure are directed to seal boss designs for the sealing architectures of the valves 110A-D that operate to increase the flow restricting area of the valves 110. In general, the perimeter length of the seal boss 126 (FIGS. 4, 5 and 10) or the bosses 126 and 126' (FIG. 6) of the disclosed valves 110 is increased by implementing a non-circular pattern, which allows the valves 110 to have a large metering area at small displacements δ of the seal plate 120 along the axis 124 relative to the orifice plate 122 without incurring a reduction in flow capacity due to the area projected above the orifice(s) 130.

Examples of a seal plate 120 having a non-circular seal boss 126 are provided in the simplified top and isometric views of FIGS. 12A-B and 13A-B. Similar seal bosses 126 may be provided within the pocket 150 of the orifice plate 122 of the valve 110D shown in FIGS. 10 and 11B.

The non-circular seal boss 126 has an extended inner and/or outer perimeter having concave regions 162A and convex regions 162B that extend the length of the inner and/or outer perimeter over its circularly shaped counterpart. For example, the length of the outer perimeter of the non-circular seal boss 126 is greater than the perimeter length of a circle 163 (phantom lines, FIG. 12A) that is tangent to the inner wall of the outer perimeter at points of maximum radius. The concave regions 162A and the convex regions 162B may take on any suitable form. In one example, concave regions 162A and the convex regions 162B generally comprise one or more concave loops or lobes 162A and convex loops or lobes 162B that increase the overall perimeter length of the seal boss 126 over a similarly sized circular seal boss 163. In one embodiment, the loops and lobes 162A and 162B have an angularly repeating pattern as shown in FIGS. 12 and 13.

Other examples of the concave regions 162A and the convex regions 162B include facets or straight-line segments and combinations of curved and straight-line segments.

In some embodiments, the seal perimeter is maximized while the product of the seal perimeter, seal displacement, and inlet pressure is equal to or less than the product of the orifice perimeter, the average of the inlet and outlet pressures, and the sum of the pocket and displacement heights.

In some embodiments, the thickness t of the seal boss 126 is minimized to reduce flow losses that may be incurred by the pattern of the seal boss 126. For example, the seal boss 126 may have a thickness t (FIGS. 12A and 13A) of approximately 0.1 to 1.0 mm.

There are several advantages to the valves 110 described above that utilize one of the disclosed seal bosses 126. These include, for example, increased sealing pressure between the seal plate and the orifice plate and reduced leakage, and faster and/or more effective lapping of the seal boss 126 to form a flat sealing surface over that of a full (flat) seal plate, and other advantages.

Figure 14:
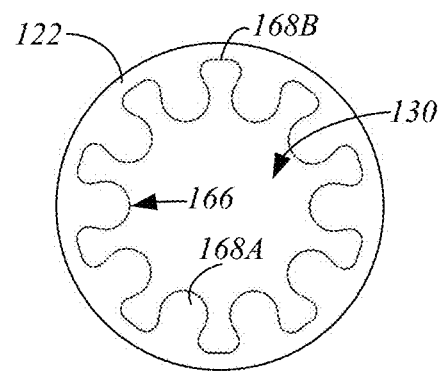
FIG. 14 is a simplified top view of an orifice plate having a non-circular orifice, in accordance with embodiments of the present disclosure.

FIG. 14 is a simplified top view of an orifice plate 122 formed in accordance with embodiments of the present disclosure. The plate 122 includes an orifice 130 that is defined by an inner wall 166. Unlike the orifice plates 122 of the valves 110A (FIGS. 4 and 7B) and 110D (FIGS. 10 and 11B), in which the orifice 130 is defined by a circular inner wall of the plate 122, the inner wall 166 of the orifice plate 122 of FIG. 14 includes convex regions 168A and concave regions 168B, such as a plurality of loops or lobes, that are similar to the concave regions 162A and the convex regions 162B discussed above with reference to FIGS. 12 and 13. As a result, the perimeter length of the orifice 130 is extended in a similar manner as the seal boss 126 of FIGS. 12 and 13. Embodiments are also directed to an orifice plate having multiple non-circular orifices 130, such as that shown in FIG. 14, and valves 110 that include the orifice plate.

Figure 15:
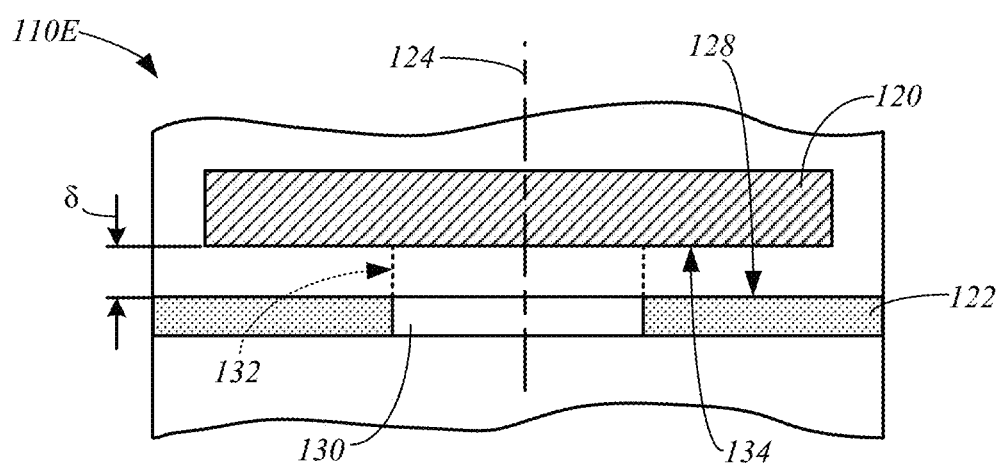
FIG. 15 is a simplified cross-sectional view of an example of a valve 110E formed using the orifice plate of FIG. 14 in the open state, in accordance with embodiments of the present disclosure.

FIG. 15 is a simplified cross-sectional view of an example of a valve 110E formed using the orifice plate 122 of FIG. 14 in the open state, in accordance with embodiments of the present disclosure. As with FIGS. 4-6 and 10, features of the valve 110E, such as the actuator 104 and the conduit or housing 118, are not shown in order to simplify the illustration.

In the illustrated example, the valve 110E is formed using a seal plate 120 having a flat seal surface 134 such as that used in the valve 110D of FIG. 10. Alternatively, the seal plate 120 of the valve 110E may take the form of the pocketed seal plate 120 of FIG. 4 having the seal boss 126 that surrounds the orifice 130. When the valve 110E is in the closed state, the seal plate 120 is moved relative to the orifice plate 122 along the axis 124 using the actuator 104 (FIG. 2) such that the surface 134 engages the surface 128 of the orifice plate 122 surrounding the orifice 130 to block fluid flow through the orifice 130.

The undulating periphery of the orifice 130 of FIG. 14 causes the corresponding projected peripheral area 132 to be increased over its circular counterpart. Due to the increased projected peripheral area, the flow capacity of the valve 110E is increased over similarly sized conventional valves (e.g., valve 200) using an orifice plate 122 having a circular orifice 130, such as by approximately 30-50% depending on the specific dimensions.

Although the present invention has been described with reference to preferred embodiments, workers skilled in the art will recognize that changes may be made in form and detail without departing from the spirit and scope of the invention.

What is claimed is:

1. A valve comprising:
   an orifice plate comprising at least one orifice surrounded by an orifice plate seal surface;
   a seal plate comprising:
      a seal boss having a seal boss surface that faces the orifice plate; and
      a pocket that overlays the at least one orifice, the pocket defined by a recessed surface that is surrounded by the seal boss surface and displaced from the seal boss surface along an axis; and
   an actuator configured to move the seal plate relative to the orifice plate along the axis to transition the valve between open and closed states,
   wherein:
      the seal boss surface engages the orifice plate seal surface, surrounds the at least one orifice, and blocks a flow of fluid through the at least one orifice when the valve is in the closed state;
      the seal boss surface is displaced from the orifice plate seal surface and does not block a flow of fluid through the at least one orifice when the valve is in the open state; and
      the seal boss is non-circular.

2. The valve of claim 1, wherein the at least one orifice consists of a single circular orifice having a diameter that is less than a diameter or width of the pocket.

3. The valve of claim 1, wherein the at least one orifice comprises a plurality of orifices.

4. The valve of claim 1, wherein the actuator comprises a small displacement actuator that is configured to move the seal plate relative to the orifice plate no more than 100 micrometers along the axis.

5. The valve of claim 4, wherein the small displacement actuator comprises a piezoelectric actuator.

6. The valve of claim 1, wherein the seal boss includes a wall having a perimeter comprising convex and concave regions and a total length which is greater than a periphery of a circle that is tangent to the perimeter at points of maximum radius.

7. The valve of claim 6, wherein the convex and concave regions of the perimeter comprise a plurality of concave and convex loops or lobes.

8. The valve of claim 7, wherein the plurality of concave and convex loops or lobes have an angularly repeating pattern.

9. The valve of claim 1, wherein the seal boss includes an edge at an intersection between the seal boss surface and the pocket having a perimeter comprising convex and concave regions and a total length which is greater than a periphery of a circle that is tangent to the edge at points of maximum radius.

10. The valve of claim 9, wherein the convex and concave regions of the perimeter comprise a plurality of concave and convex loops or lobes.

11. The valve of claim 10, wherein the plurality of concave and convex loops or lobes have an angularly repeating pattern.

* * * * *